United States Patent Office 3,236,831
Patented Feb. 22, 1966

3,236,831
XANTHOMONAS HYDROPHILIC COLLOID ETHERS
Richard G. Schweiger, 8964 Polland Ave., San Diego, Calif.
No Drawing. Filed Apr. 29, 1963, Ser. No. 276,222
16 Claims. (Cl. 260—209)

This invention relates to carboxyalkyl derivatives of the gum elaborated by *Xanthomonas campestris* and related species.

Hydrophilic colloids are many in number, and many different kinds are available commercially. In spite of the fact that such natural gums as arabic, tragacanth, karaya, guar, and seaweed derivatives have been widely available for many years, materials belonging to the same broad class are also made synthetically, such as carboxyalkyl cellulose, hydroxyalkyl cellulose, sodium polyacrylate, and the like. Moreover, gums are produced by bio-synthetic processes, such as dextran and the hydrophilic colloid produced by *Xanthomonas campestris*.

The fact that many types of such materials are commercially available, and that intensive research throughout the world is continuing on even different types, may be explained by the circumstance that all of these gums, and indeed various chemical derivatives thereof, differ among themselves in one or more properties, usually physical, chemical properties. Even such well established materials as gum arabic and gum tragacanth, for example, have entirely different fields of use, arising from their quite different behavior when dispersed in water. As is so often true in the field of colloid chemistry, it is most difficult to make predictions as to the properties which will be exhibited by a newly synthesized gum or derivative thereof. Moreover even with the wide variety of gums now available, there are many commercially important fields of use where no single available gum is ideal.

An object of the present invention is to provide a novel water dispersible gum derived by chemical treatment of the hydrophilic colloid of *Xanthomonas campestris*.

Another object of the invention is to produce similar derivatives of gums elaborated by other Xanthomonas species.

Other objects of the invention will appear as the description thereof proceeds.

*Xanthomonas campestris* is a bacterium which when grown in a suitable culture medium produces a hydrophilic colloid having important and useful properties, although, as will be seen hereinbelow, properties which may be considerably improved upon in accordance with the instant invention. *Xanthomonas campestris* is relatively well known, and indeed the bio-synthesis of its gum is already a commercially operated process in the United States. Similar gums are obtainable from other Xanthomonas species, particularly *X. begoniae* and *X. incanae*, as well as some lesser known species of Xanthomonas. Accordingly, the terms "Xanthomonas hydrophilic colloid," "*X. campestris* hydrophilic colloid," "Xanthomonas heteropolysaccharide" and "*X. campestris* heteropolysaccharide" all refer to the same material. For convenience, most of the exemplary and descriptive teaching herein will be in terms of *Xanthomonas campestris*, which as mentioned is the most readily available of those Xanthomonas species capable of elaborating this gum.

The Xanthomonas hydrophilic colloid is remarkable in being a heteropolysaccharide in which the constituent units are present in a substantially regularly repeating sequence. It may be described as a polymer containing mannose, glucose, potassium glucuronate, and acetyl in the approximate molar ratio of 2:1:1:1 respectively.

The recitation of potassium is merely exemplary since this cation is essentially exterior to the polymer itself and may be readily substituted in part or entirely by such other cations as sodium, lithium, hydrogen, and the like, depending in the first instance upon the composition of the nutrient medium in which the bio-synthesis takes place.

The most commonly used method of preparing the Xanthomonas gum is to inoculate a suitable medium with the chosen Xanthomonas species, preferably *X. campestris*, and carry out whole culture fermentation. Suitable media have been described in the literature; a typical and preferred one is an aqueous solution containing two to five percent (2 to 5%) of commercial glucose, an organic nitrogen source, dipotassium hydrogen phosphate, and appropriate trace elements. The incubation time is approximately ninety-six hours at 30° C., under aerobic conditions. Corn steep liquor or distillers' dry solubles may be used as an organic nitrogen source. It is expedient to grow the culture in two intermediate stages prior to the final innoculation in order to encourage vigorous growth of the bacteria. These stages may be carried out in media having a pH of about 7. In the first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing Xanthomonas gum, a loopful of organism from the agar slant is adequate for the first stage comprising 200 milliliters of the said glucose medium. In the second stage the material resulting from the first stage may be used together with 9 times its volume of a 3% glucose medium. In the final stage the material produced in the second stage may be admixed with 19 times its volume of the final medium. A good final medium may contain 3% glucose, 0.5% distillers' dry solubles, 0.5% dipotassium phosphate, 0.1% magnesium sulphate (MgSo$_4$·7H$_2$O) and water. The reaction in the final stage may be satisfactorily carried out for 96 hours at 30° C. with vigorous agitation and aeration. The resulting Xanthomonas gum can be recovered and sterilized by precipitation in methanol of the clarified mixture from the fermentation.

It will, of course, be understood that other nutrient media and other conditions may be employed, but they should be chosen so as to be compatible with a good production of the Xanthomonas gum, from whatever Xanthomonas species is chosen.

Now, the Xanthomonas gum the production of which has been described, and which indeed is commercially available, as has been mentioned, is naturally not suited for all possible applications for a hydrophilic colloid. When a water dispersion of this gum is made, it tends to be "short" rather than stringy, and the water solutions or dispersions are more or less turbid. These properties or disadvantages in many applications can be overcome by proceeding in accordance with my invention.

Generally speaking and in accordance with illustrative embodiments of my invention, I react a carboxyalkyl halide, such as for example, chloroacetic or chloropropionic acids, with the heteropolysaccharide in a strongly alkaline medium. Now a characteristic of Xanthomonas gum is that only about 25% of all of the constituent units (as has been hereinabove described) contain a carboxyl group; and moreover, it is partially acetylated, approximately every fourth unit having one acetyl group.

In proceeding in accordance with my invention, I obtain a degree of substitution ("D.S.") of at least 0.6 to 0.8, so that approximately every unit will have one carboxyl group subsequent to the reaction with the carboxyl alkyl halide. Furthermore, under the alkaline conditions under which my invention is carried out the heteropolysaccharide is completely deacetylated. In a typical method 2.0–5.0 mole of sodium hydroxide per mole unit of Xanthomonas gum dissolved in a mixture of water and methanol is mixed thoroughly with the polysaccharide in a Hobart mixer. The amount of sodium hydroxide is sufficient for deacetylation, neutralization of the chloroacetic acid which is added subsequently, and for the reaction to take place. The alkali mixture is then dried to remove the methanol. To this semi-dried powder is added an aqueous solution of chloroacetic acid (1.0–2.5 mole). The reaction is exothermic, and the temperature rises to about 60°. After two to three hours the reaction product is removed, dried, and extracted with aqueous methanol in order to remove salts. Instead of chloroacetic acid, sodium or, in general, alkali chloroacetate may be used; then the amount of sodium hydroxide used is correspondingly less. The chloroacetate may be added slowly in dry form, so the proportion of water added is reduced. Consequently, the efficiency of the reagent is higher. The maximum D.S. reached is between 0.7–0.8 even if larger quantities of chloroacetic acid are applied. This corresponds to about one group for each mannose and glucose unit, the uronic acid units probably not being substituted. A considerably higher D.S. is impractical of attainment. An elevated temperature over a longer period of time should be avoided because the product may become partially insoluble.

Some examples will now be given of the process of my invention:

*Example 1*

100 g. of *Xanthomonas campestris* gum was mixed in a Hobart mixer with a solution of 90 g. of sodium hydroxide in a mixture of 90 cc. of water and 150 cc. of methanol. Then the mixture was dried to remove methanol. While mixing, a solution of 94.5 g. of chloroacetic acid in 25 cc. of water was added slowly. The temperature during the following reaction went up to about 60°. Mixing was continued for 20–30 minutes (until the addition of the chloroacetic acid was complete); then it was transferred to a Heinrich mixer and mixed until homogeneous. It was kept overnight at room temperature and then extruded into methanol several times until, after drying off the methanol, hard enough to be milled. The milled product was extracted in a Soxhlet extractor with 90% methanol for 20 hours; viscosity (1%) 80.6 cps.

*Anal.*—Carboxymethyl (as glycolic acid) 21.0%.

*Example 2*

100 g. of *Xanthomonas campestris* gum was mixed (Hobart mixer) with 45 g. of sodium hydroxide dissolved in a mixture of 45 cc. of water and 75 cc. of methanol. After drying to remove the methanol, 94.5 g. of chloroacetic acid neutralized with 40 g. of sodium hydroxide in 140–150 cc. of water was added while being mixed. After further mixing in a Heinrich mixer until homogeneous, the product was extruded and kept at 55° for seven hours and then at room temperature for 15 more hours. The material then was hardened in methanol, milled, and extracted in a Soxhlet extractor with 90% methanol for 20 hours. This product was only partially soluble in water; viscosity (1%) 33.5 cps.

*Anal.*—Carboxymethyl (as glycolic acid) 20.0%.

*Example 3*

100 g. of *X. campestris* gum was mixed in a Hobart mixer with a solution of 165 g. of sodium hydroxide in about 150 cc. of water. Then 189 g. of chloroacetic acid in about 50 cc. of water was added slowly over a period of 2.75 hours. The temperature went up to about 60–70°. During the reaction 80–100 cc. more of water was added. After thorough mixing in a Heinrich mixer, the thick paste was spread on a pan and partially dried at room temperature in the presence of an air stream for about 15 hours. Then it was extruded into methanol, dried, milled, and extracted with 90% methanol; viscosity (1%) 500 cps.

*Anal.*—Carboxylmethyl (as glycolic acid) 22.0%.

*Example 4*

*Xanthomonas incanae* gum (100 g) was mixed in a Hobart mixer with a solution of 150 g. of sodium hydroxide in about 140 cc. of water. Then 170 g. of chloroacetic acid in 50 cc. of water was added slowly. The remaining procedure was the same as above in the previous example.

Viscosity (1%) 400 cps.

*Anal.*—Carboxymethyl (as glycolic acid) 21.8%.

*Example 5*

Gums from *Xanthomonas phaseoli*, *X. malvacearum*, *X. carotae*, and *X. begoniae* were reacted with glycolic acid under conditions as described above. The reaction products, after extraction with 90% methanol, contained 17–23% carboxymethyl (determined as glycolic acid).

The preferred mode of carrying out the invention is with the use of chloroacetic acid so that a carboxymethyl ether is produced. As mentioned hereinabove, however, an alternative embodiment involves the use of chloropropionic acid, which may be used either in the form of 2-chloropropionic or 3-chloropropionic. The same general conditions of reaction prevail as shown in the examples hereinabove, except that in general the reaction time is longer. However, useful products are obtained by proceeding in this fashion, even though processing times are longer, and the cost of the raw materials is considerably higher.

The material obtained in accordance with my invention differs essentially from the starting material in having completely different flow characteristics and showing different compatibility with metal ions. While, for example, the starting material has a short flow, the product obtained has a long, fairly stringy flow. Furthermore, the solutions of this product are much clearer.

There are many uses for this new derivative. It may be used, for example, as thickener of aqueous solutions. Due to its similarity to CMC but much higher stability under alkaline and acidic conditions, it may be used as an improved substitute for CMC, especially when under the conditions required CMC would be degraded. It may be used in paper and textiles or, due to the presence of carboxyl groups and its higher activity with di- and trivalent metal ions, for the preparation of thin gels. Through these properties the product also shows some similarity with alginates, although because of its special characteristics it is much superior for certain specialized applications.

While this disclosure has been made in terms of the use of sodium hydroxide as the alkalizing material in my process it will be evident that other hydroxides may be used such as lithium hydroxide, potassium hydroxide, and indeed any other similarly strong caustic. From a practical standpoint, however, caustic soda is preferred and is considerably less expensive than the others.

Also, when caustic soda is used, as will ordinarily be the case, the product will be in the form of a sodium salt. Of course, if potassium hydroxide has been used instead, then the product will be obtained in the form of a potassium salt, and so forth. Also it will be evident to those skilled in the art that even though a sodium salt may be obtained in the first instance, it may readily be converted to any other desired salt, for example the lithium salt, by acidifying, washing, and realkalizing with the desired hydroxide.

When the Xanthomonas derivative is prepared in accordance with my invention using chloroacetic acid with sodium hydroxide then the product may be designated in accordance with standard nomenclature as sodium Xanthomonas colloid glycolate; and where the invention is carried out using chloropropionic acid with sodium hydroxide then the product may be designated as sodium Xanthomonas colloid lactate. α-Chloropropionic acid and β-chloropropionic acid will lead to the α-lactate and the β-lactate respectively.

For some purposes, it will be desirable to produce the product in the form of its ammonium salt. This may be done as already suggested above by acidification, washing, and reneutralization using ammonium hydroxide. The term "alkali metal" is used herein and in the claims which follow to include not only the common alkali metals, viz., lithium, sodium, potassium, cesium, but ammonium as well.

Again, it may be desirable to provide the final product in its acid form, which may be carried out by acidification followed by washing, and eventual drying and grinding if so desired. The product may then be designated as Xanthomonas colloid glycolic or lactic acids, as the case may be.

An alternative designation of my novel compounds is an alkali metal or hydrogen carboxylalkyl Xanthomonas colloid, with the alkyl being methyl or ethyl, depending upon whether chloroacetic or chloropropionic acid respectively was used.

It will be appreciated that my invention is a broad one, although I have illustrated it with the aid of various specific examples, in which proportions, reaction times and temperatures and the like were necessarily given in specific terms. However, numerous variations in starting materials, reaction conditions and the like may be made, all within the scope of the invention as defined in the claims which follow.

I claim:

1. Alkali metal salts of the lower carboxyalkyl ethers of Xanthomonas colloid having a D.S. of between 0.6 and 0.8.

2. Alkali metal carboxymethyl Xanthomonas colloid having a D.S. of between 0.6 and 0.8.

3. Alkali metal carboxyethyl Xanthomonas colloid having a D.S. of between 0.6 and 0.8.

4. Free acid form of the lower carboxylalkyl ethers of Xanthomonas colloid having a D.S. of between 0.6 and 0.8.

5. Hydrogen carboxymethyl Xanthomonas colloid having a D.S. of between 0.6 and 0.8.

6. Hydrogen carboxyethyl Xanthomonas colloid having a D.S. of between 0.6 and 0.8.

7. Sodium salts of the lower carboxyalkyl ethers of Xanthomonas colloid having a D.S. of between 0.6 and 0.8.

8. Sodium carboxymethyl Xanthomonas colloid having a D.S. of between 0.6 and 0.8.

9. Sodium carboxyethyl Xanthomonas colloid having a D.S. of between 0.6 and 0.8.

10. Sodium carboxymethyl *Xanthomonas campestris* colloid having a D.S. of between 0.6 and 0.8.

11. The process of treating Xanthomonas colloid which comprises, reacting an acid chosen from the group consisting of chloroacetic acid and chloropropionic acid with said colloid in an alkaline medium the said chloro acid being present in an amount of from 1 to 2.5 moles per mole of colloid and the said reaction step being permitted to continue until a D.S. value of between 0.6 and 0.8 is obtained.

12. The process in accordance with claim 11 in which said acid is chloroacetic acid.

13. The process in accordance with claim 11 wherein said alkaline medium is obtained with sodium hydroxide.

14. The process in accordance with claim 11 wherein said acid is chloroacetic acid and said alkaline medium is obtained with sodium hydroxide.

15. The process in accordance with claim 11 wherein said colloid is *Xanthomonas campestris* colloid, said acid is chloroacetic and said alkaline medium is obtained with sodium hydroxide.

16. The process of making a derivative of *Xanthomonas campestris* colloid which comprises, mixing said colloid with an approximately equal weight of sodium hydroxide, approximately as much water as sodium hydroxide, and methanol in an amount approximately equal to 1⅔ the volume of water used; drying to remove said methanol; mixing therewith a solution of a weight of chloroacetic acid approximately equal to the weight of said colloid in water, maintaining said mixture until a D.S. of between about 0.6 and about 0.8 obtained.

References Cited by the Examiner

UNITED STATES PATENTS

| | | | |
|---|---|---|---|
| 2,831,855 | 4/1958 | Martin | 260—209 |
| 2,948,717 | 8/1960 | Babayan et al. | 260—234 |

OTHER REFERENCES

Sloneker et al., "Can. J. Chem.," vol. 42, July 1964, pp. 1261–1269.

LEWIS GOTTS, *Primary Examiner.*